United States Patent
Hagianu

(10) Patent No.: US 11,214,365 B2
(45) Date of Patent: Jan. 4, 2022

(54) DUAL-KITE AERIAL VEHICLE

(71) Applicant: Facebook, Inc., Menlo Park, CA (US)

(72) Inventor: Mihai Hagianu, Redwood City, CA (US)

(73) Assignee: FACEBOOK, INC., Menlo Park, CA (US)

(*) Notice: Subject to any disclaimer, the term of this patent is extended or adjusted under 35 U.S.C. 154(b) by 330 days.

(21) Appl. No.: 16/203,397

(22) Filed: Nov. 28, 2018

(65) Prior Publication Data

US 2019/0161183 A1 May 30, 2019

Related U.S. Application Data

(60) Provisional application No. 62/591,571, filed on Nov. 28, 2017.

(51) Int. Cl.
*B64C 31/06* (2020.01)
*B64C 39/02* (2006.01)

(52) U.S. Cl.
CPC ............ *B64C 31/06* (2013.01); *B64C 39/022* (2013.01); *B64C 2201/042* (2013.01); *B64C 2201/107* (2013.01); *B64C 2201/122* (2013.01); *B64C 2201/127* (2013.01)

(58) Field of Classification Search
CPC . B64C 31/06; B64C 39/022; B64C 2201/042; B64C 2201/107; B64C 2201/122; B64C 2201/127
USPC ...................................................... 244/153 R
See application file for complete search history.

(56) References Cited

U.S. PATENT DOCUMENTS

| | | | |
|---|---|---|---|
| 8,134,249 B2 * | 3/2012 | Ippolito | B65H 51/14 290/55 |
| 8,157,205 B2 | 4/2012 | Mcwhirk | |
| 8,864,063 B2 | 10/2014 | Heppe | |
| 2002/0040948 A1 * | 4/2002 | Ragner | B64C 31/06 244/153 R |

(Continued)

FOREIGN PATENT DOCUMENTS

EP 2 491 244 A2 8/2016

OTHER PUBLICATIONS

International Preliminary Report on Patentability as received in PCT/US2018/062897 dated Jun. 11, 2020.
(Continued)

*Primary Examiner* — Brady W Frazier
(74) *Attorney, Agent, or Firm* — Keller Jolley Preece

(57) ABSTRACT

Systems and methods are disclosed for implanting a dual-kite aerial vehicle including a first kite apparatus, a second kite apparatus, and a tether extending between the first and second kite apparatuses. In particular, the disclosed systems include a first kite apparatus including a first flight controller that maintains flight at a first altitude. The disclosed system further includes a second kite apparatus including a second flight controller that maintains flight at a second altitude. The flight controllers can cooperatively maintain a gradient air movement between the first and second altitudes by extending or retracting the tether to modify a difference in the air movements between the first and second kite apparatuses. The systems described herein additionally include components for generating electrical energy from the gradient air movement to extend a flight time of the dual-kite aerial vehicle.

20 Claims, 7 Drawing Sheets

(56) References Cited

U.S. PATENT DOCUMENTS

| | | | |
|---|---|---|---|
| 2009/0072092 A1* | 3/2009 | Griffith | B64C 31/06 244/155 A |
| 2009/0278353 A1* | 11/2009 | Da Costa Duarte Pardal | F03D 80/30 290/44 |
| 2009/0302149 A1 | 12/2009 | Fuchs et al. | |
| 2010/0327104 A1* | 12/2010 | Sainct | B64C 31/02 244/3 |
| 2012/0232721 A1* | 9/2012 | Engblom | G05D 1/105 701/3 |
| 2012/0312918 A1* | 12/2012 | Heppe | B64B 1/00 244/30 |
| 2014/0210212 A1 | 7/2014 | Hardy | |
| 2015/0183517 A1* | 7/2015 | Jensen | B64C 39/022 244/76 R |
| 2015/0225080 A1* | 8/2015 | Bormann | B64F 3/00 244/155 A |

OTHER PUBLICATIONS

International Search Report & Written Opinion as received in PCT/US2018/062897 dated Mar. 20, 2019.

\* cited by examiner

DUAL-KITE AERIAL VEHICLE

CROSS REFERENCE TO RELATED APPLICATIONS

The present application claims priority from U.S. Provisional Application No. 62/591,571 filed Nov. 28, 2017. The aforementioned application is hereby incorporated by reference in its entirety.

BACKGROUND

Aerial vehicles are becoming increasingly common. Indeed, consumers, governments, and various enterprises have begun to utilize unmanned aerial vehicles (UAVs) to perform various operations. For example, developers have recently created high-altitude, long-endurance UAVs to perform flight missions that last an extended period of time. For instance, developers have created high-altitude, long-endurance UAVs that provide improved digital communication capabilities.

As UAV design moves into this challenging new frontier, shortcomings of conventional aircraft design have become increasingly apparent. For example, because UAVs need to periodically refuel, recharge, and/or receive maintenance in order to operate reliably, maintaining operation over large areas and over extended periods of time has become expensive and presents various challenges. For instance, with higher demands on flight paths and flight times, UAVs have generally increased in size and cost to satisfy requirements for carrying out flight missions. Indeed, designing and implementing UAVs capable of carrying more fuel and/or carrying out longer missions often results in larger, heavier, and ultimately more expensive UAVs.

In addition, conventional UAVs often experience poor performance as a result of unpredictable flight conditions. For instance, unpredictable weather, varying air speeds, and other environmental conditions can interfere with flight missions causing the UAV to fail in performing various tasks or fly off a predetermined path. Further, while UAVs often include functionality for altering a flight path, doing so often causes UAVs to consume more fuel/energy, further contributing to higher costs associated with operating conventional UAVs.

These and other problems exist with regard to conventional UAV design.

BRIEF SUMMARY

One or more embodiments described herein provide benefits and/or solve one or more of the foregoing and other problems in the art with systems for providing UAVs for use in various flight conditions. Indeed, one or more embodiments described include a dual-kite aerial vehicle including a first kite apparatus and a second kite apparatus. The dual-kite aerial vehicle includes a tether extending between the first kite apparatus and the second kite apparatus. For example, while in flight, the first kite apparatus can maintain flight at a first altitude while the second kite apparatus maintains flight at a second altitude lower than the first altitude. In addition, the dual-kite aerial vehicle can include a flight control system including one or more flight controllers for controlling a flight path of the respective kite apparatuses.

As will be described in further detail below, the dual-kite aerial vehicle includes kite apparatuses at different altitudes to maintain flight of the dual-kite aerial vehicle over extended periods of time. For example, in one or more embodiments, the dual-kite aerial vehicle includes a first kite apparatus at a first altitude coupled to a second kite apparatus at a second altitude by a long tether (e.g., approximately one kilometer tether). In addition, the dual-kite aerial vehicle utilizes the difference in air movement (e.g., a gradient air movement) at the different altitudes to maintain flight of the dual-kite aerial vehicle over an extended period of time. For example, by maintaining the first kite apparatus at a first altitude that has greater air movement than the second kite apparatus at a second (lower) altitude, the dual-kite aerial vehicle maintains flight for an extended period of time while consuming less fuel than conventional UAVs, thereby reducing costs associated with maintaining flight of UAVs for extended periods of time.

In addition to utilizing the difference in air movement at the different altitudes to maintain flight, the dual-kite aerial vehicle includes components for leveraging environmental forces to power various components of the dual-kite aerial vehicle, further extending flight time of the dual-kite aerial vehicle. For example, as will be described in further detail below, the dual-kite aerial vehicle includes one or more power generators that converts forces applied to the tether (e.g., as a result of the gradient air movement) to electrical energy for powering the respective flight controllers. As another example, the dual-kite aerial vehicle can include solar panels on one or both of the kite apparatuses that collect energy for use in powering various components of the dual-kite aerial vehicle. By leveraging environmental forces in this way, the dual-kite aerial vehicle further extends flight time while maintaining control of the flight path, further reducing cost associated with maintaining flight of UAVs for extended periods of time.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description refers to the accompanying drawings, in which.

DETAILED DESCRIPTION

Figure 1:
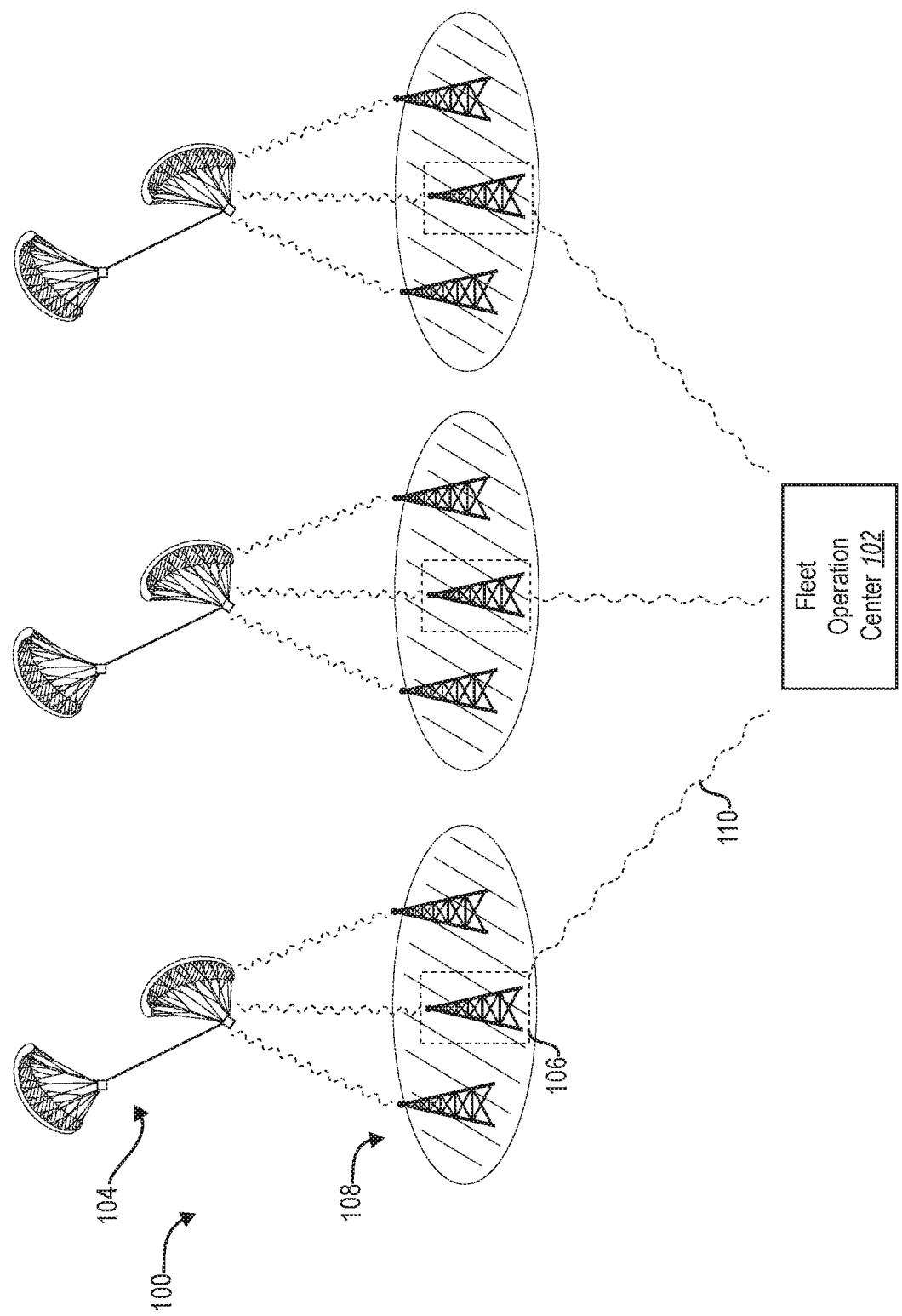
FIG. 1 illustrates an example environment in which a dual-kite aerial vehicle operates in accordance with one or more embodiments.

One or more embodiments of the present disclosure include a dual-kite aerial vehicle including multiple kite apparatuses capable of sustaining flight over an extended period of time while consuming little or no fuel. In particular, the dual-kite aerial vehicle includes a first kite apparatus that flies at a first altitude. The dual-kite aerial vehicle additionally includes a second kite apparatus that flies at a second (lower) altitude. The first kite apparatus is coupled to the second kite apparatus via a tether that extends between the kite apparatuses. In one or more embodiments, each of the kite apparatuses include respective flight controllers coupled to one or more actuators of the respective kite apparatuses. As will be described in further detail below, the flight controllers can cooperatively control a flight path of the dual-kite aerial vehicle over an extended period of time.

To illustrate, as will be described in further detail below, the dual-kite aerial vehicle includes a first kite apparatus that maintains flight at a first altitude and a second kite apparatus that maintains flight at a second altitude (e.g., a lower altitude than the first altitude). In particular, the dual-kite aerial vehicle includes two kite apparatuses designed for flight at different altitudes having different air movements (e.g., air speeds, air masses). The different air movement between the first and second altitudes applies a larger force to the first kite apparatus relative to a corresponding force applied to the second kite apparatus thereby enabling the dual-kite aerial vehicle to maintain flight as a result of the first kite apparatus pulling on the tether extending between the kite apparatuses.

The dual-kite aerial vehicle further includes a flight control system for controlling flight of the dual-kite aerial vehicle. In particular, the dual-kite aerial vehicle includes electrical components (e.g., memory, a processor, electrical circuitry) coupled to various actuators on the kite apparatuses capable of changing direction, altitude, speed, pitch, angle of attack, or other movement of the kite apparatuses that enables sustained flight and/or causes the dual-kite aerial vehicle to follow a predefined path. For example, where the dual-kite aerial vehicle includes hardware for providing bandwidth to a geographic region, the flight control system can activate various actuators to direct one or both of the kite apparatuses along a flight path within the geographic region. As will be described in further detail below, the flight control system can include a flight controller for each kite apparatus connected to actuators for controlling flight of the individual kite apparatuses. In this way, the flight controllers can cooperatively control a flight path of the dual-kite aerial vehicle.

In addition to generally controlling a path of flight of the dual-kite aerial vehicle along a predefined path or within a target geographic region, the flight control system can additionally maintain a gradient air movement between air movements of the respective altitudes of the kite apparatuses. For example, in one or more embodiments, the flight control system causes the dual-kite aerial vehicle to climb or descend such that the gradient air movement remains at a target difference between the current altitudes of the kite apparatuses. Alternatively, in one or more embodiments, the flight control system causes the dual-kite aerial vehicle to alter a path until a target air motion gradient is found.

In one or more embodiments, the flight controller maintains the gradient air movement by modifying a length of the tether extending between the kite apparatuses. For example, in one or more embodiments, the dual-kite aerial vehicle includes a winch capable of extending and/or retracting the tether. In one or more embodiments, the flight controller alters the length of the tether to selectively change the altitude of one or both kite apparatuses until a target gradient air motion is found. In this way, the dual-kite aerial vehicle maintains predictable flight conditions that further extend a flight time of the dual-kite aerial vehicle while further enabling the flight controller to navigate a path of the dual-kite aerial vehicle within a predefined geographic region.

Moreover, in one or more embodiments, the dual-kite aerial vehicle includes features and functionality for utilizing environmental conditions to power various components of the dual-kite aerial vehicle, thereby lengthening an amount of time that the dual-kite aerial vehicle can remain in flight without docking for maintenance. For example, in one or more embodiments, the dual-kite aerial vehicle includes one or more power generators that convert forces applied to the system (e.g., the tether) to electrical energy to power the flight controllers and/or actuators of the kite apparatuses. In addition, in one or more embodiments, one or both of the kite apparatuses include one or more solar panels that convert solar energy to electrical energy for powering the flight controllers and/or actuators of the kite apparatuses.

While one or more embodiments described herein include kite apparatuses including conventional kite structures including a pliable fabric (e.g., a carbon fiber fabric) that overlays a kite frame, the dual-kite aerial vehicle can alternatively include kite apparatuses having different structures. For example, in one or more embodiments, one or both of the kite apparatuses include a wing structure, drone structure, UAV, or other non-fabric structures coupled together via a tether extending between apparatuses at different altitudes. For instance, as will be described in further detail herein, in one or more embodiments, the dual-kite aerial vehicles include airfoil-shaped wing structures coupled together via a tether extending between first and second altitudes of the corresponding wing structures. Additional detail with respect to different example embodiments will be provided in further detail below.

The dual-kite aerial vehicle described herein provides a variety of advantages and benefits over conventional high-altitude UAVs. For example, by implementing light-weight kite and/or wing structures that maintain flights at different altitudes, the dual-kite aerial vehicle utilizes forces exerted on the kite apparatuses as a result of different air movements corresponding to the altitudes of the respective kite apparatuses. This maintains a constant tension on the tether extending between the kite apparatuses thereby enabling the dual-kite aerial vehicle to maintain flight for an extended period while controlling a flight path of the dual-kite aerial vehicle over a predefined geographic region.

In addition, the dual-kite aerial vehicle reduces fuel consumption by converting various environmental forces to electrical energy to power components of the dual-kite aerial vehicle. For example, by converting solar energy and/or forces applied as a result of the gradient air movement to electrical energy, the dual-kite aerial vehicle can power various components of the dual-kite aerial vehicle without consuming fuel. As mentioned above, reducing fuel consumption in this way reduces an overall weight of the dual-kite aerial vehicle as well as costs associated with storing and consuming fuel for powering the dual-kite aerial vehicle, thereby reducing overall cost of operation of the dual-kite aerial vehicle.

In addition, by utilizing independent flight controls in addition to a single tether extending between the kite apparatuses, the dual-kite aerial vehicle facilitates a more predicable single point of force between the kite apparatuses at the different altitudes that grants greater cooperative control over the dual-kite aerial vehicle. Having a single point of force extending between the kite apparatuses provides greater control to the respective flight controllers to navigate a predictable flight path while maintaining a constant gradient air movement between the different altitudes of the kite apparatuses. Indeed, by tethering the kite apparatuses using a long, single tether, the dual-kite aerial vehicle can maintain greater control of the dual-kite aerial vehicle while taking advantage of significantly different gradient air movement that would not be possible utilizing multiple tethers extending between the first and second kite apparatuses.

As illustrated by the foregoing discussion, the present disclosure utilizes a variety of terms to described features and benefits of the dual-kite aerial vehicle. Additional detail is now provided regarding the meaning of these terms.

As used herein, a "kite apparatus" refers to a flight structure at an end of a tether and forming a part of an unmanned aerial vehicle capable of maintaining flight over an extended period of time. For example, a kite structure can be a kite, a wing, or other structure having various shapes and sizes in accordance with one or more embodiments described herein. For instance, where a dual-kite aerial vehicle includes two kite apparatuses coupled together via one or more tethers tether, a kite apparatus may refer to a structure including a wing frame, material stretched over at least a portion of the wing frame, and one or more actuators for modifying an angle, direction, or other movement of the wing frame. In addition, the kite apparatus can include a payload including electrical hardware for communicating signals (e.g., providing internet connectivity), solar panels for collecting solar energy, one or more turbines or other power generators for generating electrical energy, other components for carrying out a flight mission of the dual-kite aerial vehicle.

As used herein, "air movement" refers to a measurement associated with air or wind at a corresponding altitude. For example, air movement may refer to wind speed, wind intensity, air mass, air flow, or other unit of measurement that applies or otherwise contributes to a force applied to a surface of the kite apparatus. In one or more embodiments described herein, a "gradient air movement" refers to a difference in air movement between two different altitudes. For instance, in one or more embodiments, a gradient air movement refers to a difference in wind speed between a first measurement of wind speed at a first altitude and a second measurement of wind speed at a second altitude.

As mentioned above, the dual-kite aerial vehicle includes a flight control system including one or more flight controllers. As used herein, a "flight controller" refers to hardware, software, or a combination of both for controlling a flight path of a corresponding kite apparatus. For example, in one or more embodiments, a flight controller includes one or more processors for executing instructions associated with maintaining flight, controlling altitude, and/or navigating a flight path over a predefined geographic area. For instance, in one or more embodiments, a flight controller provides a control signal to activate one or more actuators of a corresponding kite apparatus to modify a flight path, change an altitude, or otherwise control motion of the kite apparatus. The flight controller can additionally include communication hardware for communicating with the flight controller of the other kite apparatus to cooperatively control a flight path of the dual-kite aerial vehicle. Additional features and functionality of the flight controllers will be provided in further detail below.

Additional detail will now be given in relation to illustrative figures portraying example embodiments. For example, FIG. 1 illustrates an environment in which a dual-kite aerial vehicle may operate in accordance with one or more embodiments described herein. For example, FIG. 1 illustrates an example environment in which one or more high-altitude dual-kite aerial vehicles provide connectivity (e.g., Internet connectivity) to one or more areas. For example, the dual-kite aerial vehicle may be dispatched to provide connectivity to areas with no connectivity or limited connectivity (e.g., 2G or less).

In particular, FIG. 1 illustrates an example environment 100 including a fleet operation center (FOC) 102 that communicates with a number of dual-kite aerial vehicles including features and functionality as described in one or more embodiments herein. By way of example shown in FIG. 1, the environment 100 includes a dual-kite aerial vehicle 104 in communication with a gateway 106 and customer premise equipment (CPE) 108. As further shown, the gateway 106 communicates with the FOC 102 by way of a communication link 110 (e.g., radio frequency (RF) link), data backhaul link) over which the FOC 102 provides command and control data and receives data from the dual-kite aerial vehicle 104. While FIG. 1 illustrates an example environment 100 including the FOC 102 and three dual-kite aerial vehicles, in one or more embodiments, the FOC 102 provides a single FOC to any number of dual-kite aerial vehicles by way of representative communication channels, gateways, and CPE.

By way of example, the FOC 102 can make use of various types of computing devices to receive and/or transmit data to the UAVs by way of respective gateways. For example, in one or more embodiments, the FOC 102 may make use of one or more server device(s). In addition, in one or more embodiments, the FOC 102 includes or otherwise implements various non-mobile or mobile client devices such as desktop computers, servers, laptops, tablets, etc.

In addition, as shown in FIG. 1, in one or more embodiments, the FOC 102 communicates with the dual-kite aerial vehicles by way of gateways via a communication link 110 (e.g., an RF link) between the FOC 102 and respective gateways. It will be understood that the FOC 102 can communicate with the gateways and/or dual-kite aerial vehicles by way of one or multiple networks that make use of one or more communication platforms or technologies suitable for transmitting data. In one or more embodiments, the FOC 102 communicates with the gateways via an RF link. Alternatively, in one or more embodiments, the FOC 102 communicates with the gateways via other types of networks using various communication technologies and protocols.

In one or more embodiments, the dual-kite aerial vehicle is launched from an aircraft at an altitude having a target air movement. Once launched, the flight controllers of the respective kite apparatuses can cause the dual-kite aerial vehicle to stabilize at a target altitude. Once stabilized, the dual-kite aerial vehicle can maintain flight within a target geographic region and provide Internet backhaul to ground-based cellular base stations (e.g., CPE). In one or more embodiments, command, control, and telemetry for the dual-kite aerial vehicle is accomplished from the FOC 102 through a secure channel over the Internet backhaul. In one or more embodiments, a secondary link is provided via a satellite communication system.

In one or more embodiments, the dual-kite aerial vehicle primarily performs operations independent from a satellite communication (SATCOM) datalink. For example, in one or more embodiments, the dual-kite aerial vehicle utilizes a SATCOM datalink exclusively for command and control and emergency operations. In one or more embodiments, a radio frequency datalink is used to provide connectivity between the dual-kite aerial vehicle and base stations/gateway. In one or more embodiments, a radio frequency datalink is used to provide connectivity between the dual-kite aerial vehicle and customer end points. In addition, in one or more embodiments, the dual-kite aerial vehicle connects to a base station (e.g., ground entry point/gateway) via an optical link.

Figure 2:
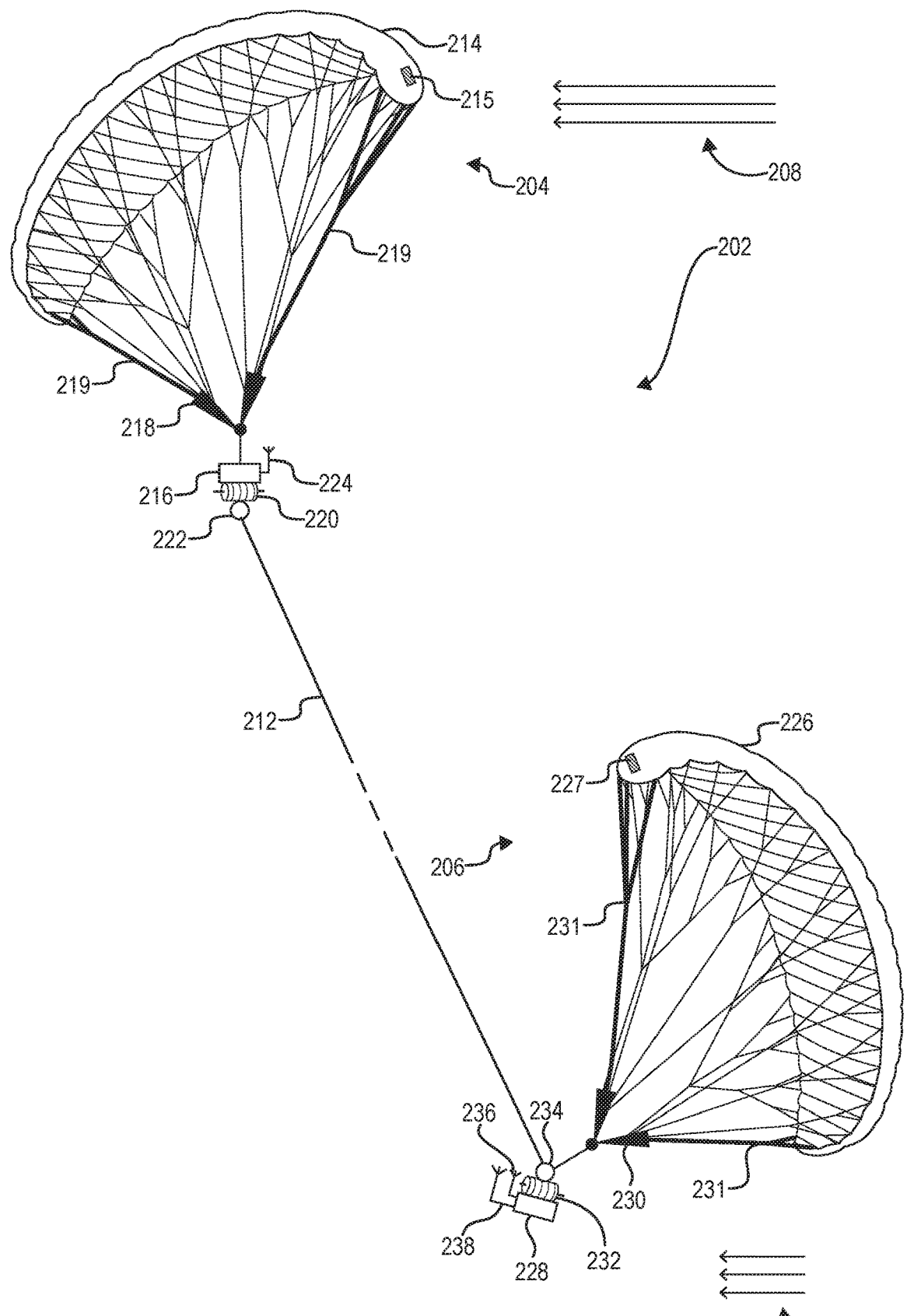
FIG. 2 illustrates an example dual-kite aerial vehicle in accordance with one or more embodiments.

As mentioned above, systems and methods described herein accomplish many of the above benefits by implementing a dual-kite aerial vehicle including kite apparatuses connected via a tether extending between a first kite apparatus at a first altitude and a second kite apparatus at a second altitude. For example, FIG. 2 illustrates an example dual-kite aerial vehicle 202 including a first kite apparatus 204 at a first altitude and a second kite apparatus 206 at a second (lower) altitude. As shown in FIG. 2, the first kite apparatus 204 maintains flight at a first altitude having a first air movement 208 while the second kite apparatus 206 maintains flight at a second altitude having a second air movement 210. As further shown, the dual-kite aerial vehicle 202 includes a tether 212 extending between the first kite apparatus 204 at the first altitude and the second kite apparatus 206 at the second altitude.

As indicated above, the dual-kite aerial vehicle 202 maintains a gradient air movement corresponding to a target difference in air movement between the first air movement 208 and the second air movement 210. In particular, because the first kite apparatus 204 maintains flight at a higher altitude than the second kite apparatus 206, the first air movement 208 at the first altitude is generally significantly higher than the second air movement 210 at the second altitude. As a result of the gradient air movement, the first kite apparatus 204 causes an upward and lateral force (via the tether 212) to be applied on the second kite apparatus 206, as shown in FIG. 2.

As mentioned above and as shown in the example of FIG. 2, the dual-kite aerial vehicle 202 includes a single tether 212 extending between the first kite apparatus 204 and the second kite apparatus 206. Indeed, in contrast to many conventional kite systems that include multiple lines for controlling a path of a kite, the dual-kite aerial vehicle 202 utilizes a single tether 212 to connect the kite apparatuses 204, 206 while relying primarily on the flight controllers 216, 228 to control a trajectory of the dual-kite aerial vehicle 202. Accordingly, the tether 212 provides a point of force between the first kite apparatus 204 and the second kite apparatus 206 that enables the dual-kite aerial vehicle 202 to maintain a constant gradient air movement between the first air movement 208 and the second air movement 210 corresponding to altitudes of the respective kite apparatuses 204, 206.

The tether 212 can be made from a variety of materials. For example, in one or more embodiments, the tether 212 includes a conductive line extending between the first kite apparatus 204 and second kite apparatus 206 that enables flight controllers 216, 228 of the respective kite apparatuses 204, 206 to communicate. Alternatively, in one or more embodiments, the tether 212 includes a non-conductive material that encloses a conductive path (e.g., one or more wires) that passes between the flight controllers 216, 228 via the tether 212. Alternatively, as will be described in further detail below, the flight controllers 216, 228 can communicate wirelessly using one or more antennas or other wireless communication devices.

In one or more embodiments, the tether 212 has a significantly longer length than the dimension of the kite structures and/or lines connecting the kite structures to corresponding flight controllers. As an illustrative example, in one or more embodiments, the first kite structure 214 includes approximately ten square meters of material over a kite frame and a three-meter line connecting the first kite structure 214 to the first flight controller 216. In contrast, the tether 212 may include one or more kilometers of line extending between the first and second kite apparatuses 204, 206. Accordingly, the tether 212 can have a significantly longer length than dimensions of the kite structure 214 and/or lines (e.g., command lines 219) connecting the kite structure 214 to the flight controller 216 (e.g., by a factor of 10, 100, 1000).

As shown in FIG. 2, the kite apparatuses 204, 206 includes various components for accomplishing various features and functionality described herein. For instance, in the example shown in FIG. 2, the first kite apparatus 204 includes kite structure 214 including a frame and material for catching air and providing an upward lifting force on the first kite apparatus 204. The kite structure 214 can include a variety of materials including nylon, carbon fiber, or other sturdy and lightweight material capable of capturing air movement and maintaining flight over an extended period of time.

In one or more embodiments, the first kite apparatus 204 includes sensors 215 for detecting a measurement of the air movement 208. For example and not by way of limitation, the sensors 215 can include temperature sensors, barometers, accelerometers (e.g., 3 axis accelerometers), gyroscopes (e.g., three-axis gyroscopes), magnetometers (e.g., three-axis magnetometers), GPS, or other types of sensors capable of detecting and measuring movement of the kite apparatus 204 and/or detecting and measuring the first air movement 208 corresponding to the first altitude of the first kite apparatus 204 and coming into contact with the kite structure 214. Further, while FIG. 2 illustrates an example in which the sensors 215 are implemented within the kite structure 214, in one or more embodiments, some or all of the sensors 215 described above are included within the flight controller 216 coupled to the kite structure 214.

As mentioned above, and as further shown in FIG. 2, the first kite apparatus 204 includes a flight controller 216 including software, hardware, or a combination of hardware and software for controlling a flight path of the first kite apparatus 204 and carrying out a flight mission in accordance with instructions stored on a computer readable storage medium. Indeed, as will be described in further detail below, the flight controller 216 can include a processor and electrical hardware for carrying out various flight instructions and maintaining flight of the dual-kite aerial vehicle 202 over a geographic region for a target period of time. In one or more embodiments, the flight controller 216 includes or otherwise implements one or more types of computing devices including one or more processors and a non-transitory computer readable medium for executing instructions. Additional detail with regard to different types of computing devices that may be implemented within the flight controller 216 is described in reference to FIGS. 5-7.

The flight controller 216 can direct a flight path of the first kite apparatus 204 in a variety of ways. In particular, as shown in FIG. 2, the first kite apparatus 204 includes one or more actuators 218 coupled to the kite structure 214, flight controller 216 and command lines 219. In one or more embodiments, the flight controller 216 modifies the flight path by activating one or more of the actuators 218 causing the first kite apparatus 204 to change directions, speed, pitch, angle of attack, or other movement that affects a trajectory of the first kite apparatus 204.

The actuators 218 can refer to various types of actuators for controlling a flight path of the first kite apparatus 204. For example, in one or more embodiments, the actuators 218 refer to mechanical actuators that control movement of or apply a force to a portion of the kite structure 214. For instance, the actuators 218 can refer to mechanical arms, levers, or other components that pull, release, or otherwise apply a force to command lines 219 attached to the kite structure 214 and cause the first kite apparatus 204 to change directions, change a pitch or angle of attack, or modify a trajectory of the first kite apparatus 204. As used herein, an actuator may refer to any type of actuator including, by way of example, a hydraulic actuator, electric actuator, or mechanical actuator.

As shown in FIG. 2, the first kite apparatus 204 additionally includes a winch 220 coupled to the flight controller 216 and the tether 212. In addition to activating the actuators 218 to modify a trajectory of the first kite apparatus 204, the flight controller 216 can additional control a winch 220 (or other type of actuator) for controlling an altitude of the first kite apparatus 204 relative to the second kite apparatus 206. For example, based on a detected air speed (e.g., as detected by the sensors 215), the fight controller 216 can cause the winch 220 to extract or retract the tether 212, thereby causing the first kite apparatus 204 to raise or lower in altitude relative to the second kite apparatus 206.

As further shown in FIG. 2, the first kite apparatus 204 includes a power generator 222 for converting a force applied by the tether 212 to electrical power. In one or more embodiments, the power generator 222 includes turbine, a crank, or other type of electric generator capable of converting mechanical energy into electrical power. Indeed, as the first air movement 208 causes the first kite apparatus 204 to apply a mechanical force on the tether 212, the power generator 222 can turn, move, or other mechanism to generate mechanical energy which the power generator 222 converts to electrical power. In one or more embodiments, the power generator 222 additionally stores a reserve of power (e.g., charges a battery) that facilitates continuous or near-continuous operation of the flight controller 216 and various actuators of the first kite apparatus 204.

As mentioned above, the dual-kite vehicle 202 can maintain a gradient air movement between the first air movement 208 and the second air movement 210 such that a constant force is being applied to the tether 212. By applying a constant force to the tether 212, the power generator 222 can provide a constant source of electrical energy for powering the flight controller 216 and other components of the first kite apparatus 204 powered by electrical power. Accordingly, in one or more embodiments, the flight controller 216 maintains a trajectory and altitude in accordance with a target gradient air movement in order for the power generator 222 to provide a constant (or near constant) source of power.

In one or more embodiments, the power generator 222 provides a primary source of power for the actuators 218, flight controller 216, winch 220, and other components of the first kite apparatus 204. Alternatively, in one or more embodiments, the power generator 222 provides a supplemental power source for a primary power source (e.g., a battery, a fuel-powered engine) that enables the dual-kite aerial vehicle 202 to maintain flight for a longer period of time.

In one or more embodiments, the first kite apparatus 204 additionally includes an antenna 224 coupled to the flight controller 216. Utilizing the antenna 224, the flight controller 216 can communicate with another flight controller (e.g., flight controller 228) of the second kite apparatus 206. In addition, the flight controller 216 can utilize the antenna 224 to communicate with flight controllers of other dual-kite aerial vehicles (e.g., to avoid collisions). The flight controller 216 can additionally receive communications from other flight controllers or from the FOC 102.

In addition to the components illustrated in FIG. 2, the first kite apparatus 204 can include one or more additional components. For example, in one or more embodiments, the first kite apparatus 204 includes a heater or device for providing temperature control. In addition, in one or more embodiments, the first kite apparatus 204 includes a camera for capturing images or otherwise enabling an operator to visually identify potential problems with a dual-kite aerial vehicle while in flight.

As mentioned above, in addition to the first kite apparatus 204, the dual-kite aerial vehicle 202 includes a second kite apparatus 206 that maintains flight at a second altitude lower than the first altitude of the first kite apparatus 204. The second kite apparatus 206 can include many similar components as described above in connection with the first kite apparatus 204. For example, as shown in FIG. 2 the second kite apparatus 206 includes a kite structure 226, sensors 227, a flight controller 228, actuators 230, command lines 231, a winch 232, and a power generator 234. The kite structure 226, sensors 227, flight controller 228, actuators 230, command lines 231, winch 232, and power generator 234 of the second kite apparatus 206 may share similar features and functionality as corresponding components of the first kite apparatus 204 described above. Accordingly, one or more embodiments described above in connection with components of the first kite apparatus 204 can similarly apply to the second kite apparatus 206.

Furthermore, in the example second kite apparatus 206 shown in FIG. 2, the second kite apparatus 206 includes multiple antennas coupled to the flight controller 228. In particular, the second kite apparatus 206 includes a first antenna 236 for communicating with the flight controller 216 of the first kite apparatus 204 and a second antenna 238 (or multiple antennas) for providing internet connectivity to client devices within a geographic region. Alternatively, the second kite apparatus 206 can include additional (or fewer) antennas for communicating between flight controllers, the FOC 102, and for providing internet connectivity to client devices.

As indicated above, the dual-kite aerial vehicle 202 can include a flight control system including both the first flight controller 216 and the second flight controller 228 that cooperatively control a flight path and altitude of the respective kite apparatuses 204, 206. Indeed, the first flight controller 216 can communicate with the second flight controller 228 to simultaneously activate actuators 218, 230 and winches 220, 234 on both the first kite apparatus 204 and second kite apparatus 206 to more effectively modify a trajectory of the dual-kite aerial vehicle 202 and/or altitudes of the respective kite apparatuses 204, 206.

In addition to utilizing the first and second winches 220, 234 to fine-tune the altitudes of the first kite apparatus 204 and the second kite apparatus 206 in order to maintain a constant gradient air movement between the air movements 208, 210, the flight controllers 216, 228 can utilize one or both of the winches 220, 234 to elevate the altitude of the dual-kite aerial vehicle 202. In particular, the flight controllers 216, 228 can cause one or both of the winches 220, 234 to alternate between extending and retracting the tether 212 to create a flapping motion of the first kite structure 214 (and/or second kite structure 226) and cause the dual-kite aerial vehicle 202 to move upward. For example, in one or more embodiments, the second flight controller 228 creates the flapping motion of the first kite structure 214 by alternatively extending and retracting the second winch 232 in succession over a brief period of time.

While FIG. 2 illustrates an example in which the dual-kite aerial vehicle 202 includes two kite structures 214, 226 coupled to independent flight controllers 216, 228, the dual-kite aerial vehicle 202 can alternatively include different structures and configurations of components. For example, in one or more embodiments, as an alternative to kite structures, the dual-kite aerial vehicle 202 can include wing structures, drone structures, or other structures capable of utilizing an air movement to maintain flight over a period of time. In addition, while FIG. 2 illustrates an embodiment in which the actuators, flight controllers, winch, and power generator are implemented apart from the kite structures, some or all of these components can be implemented within a common structure on one or both of the kite apparatuses.

Figure 3:
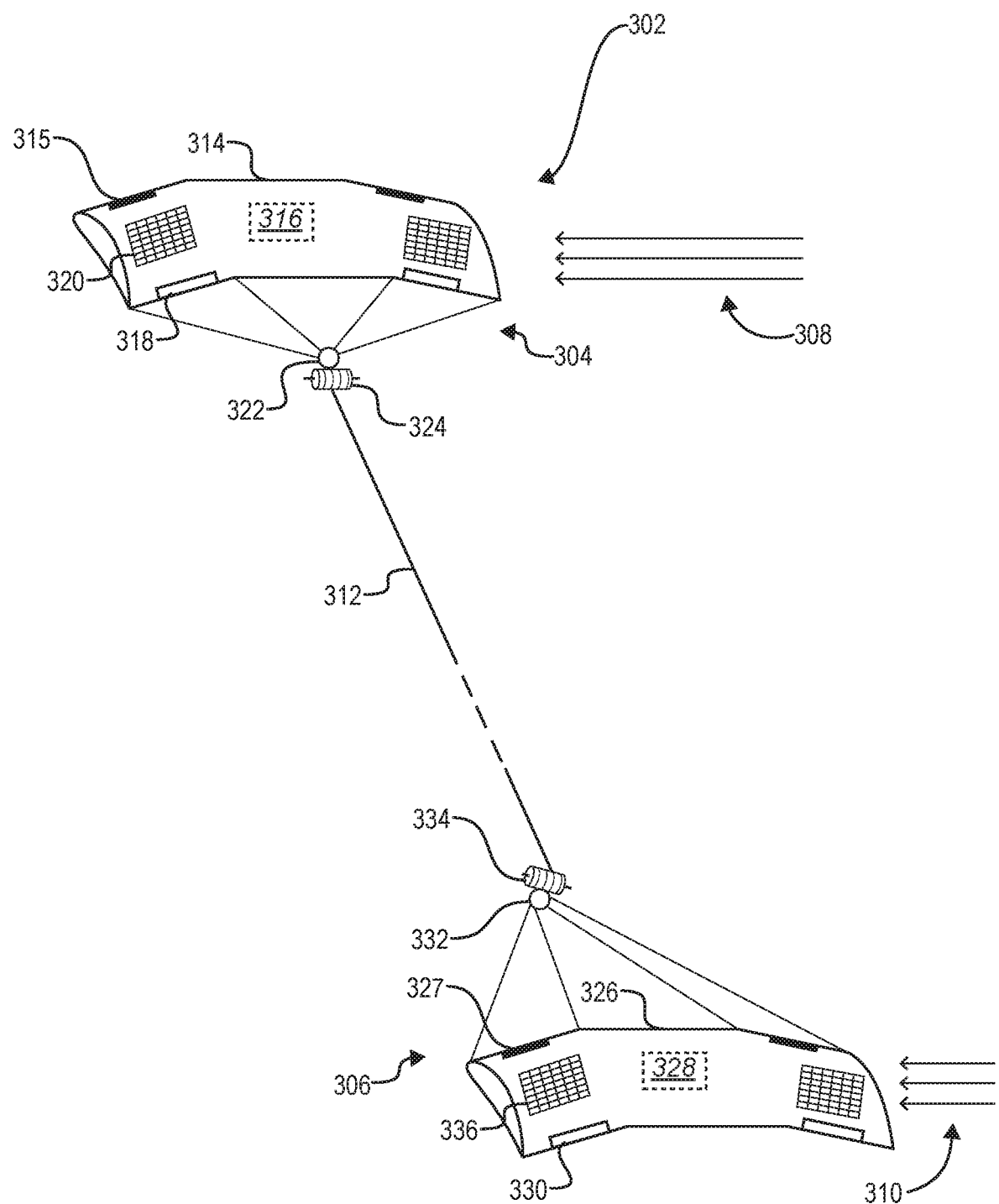
FIG. 3 illustrates another example dual-kite aerial vehicle in accordance with one or more embodiments.

As an example, FIG. 3 illustrates a dual-kite aerial vehicle including two wing structures in accordance with one or more embodiments. In particular, as shown in FIG. 3, the dual-kite aerial vehicle 302 includes a first kite apparatus 304 at a first altitude and a second kite apparatus 306 at a second (lower) altitude. As shown in FIG. 3, the first kite apparatus 304 maintains flight at a first altitude corresponding to a first air movement 308 while the second kite apparatus 306 maintains flight at a second altitude corresponding to a second air movement 310. Similar to one or more embodiments described herein, the first kite apparatus 304 and the second kite apparatus 306 maintain flights at respective altitudes to maintain a target gradient air movement between the first air movement 308 and the second air movement 310.

Similar to the example shown in FIG. 2, the dual-kite aerial vehicle 302 includes a tether 312 extending between the first kite apparatus 304 and the second kite apparatus 306. The tether 312 can consist of a single tether 312 having a length that extends one or more kilometers between the first kite apparatus 304 and the second kite apparatus 306. The tether 312 can include similar features and functionality as the tether 212 described above in connection with FIG. 2. For example, the tether 312 can provide a point of force between the kite apparatuses 304, 306 that facilitates generating electrical energy to power components of flight controllers, actuators, and other components of the kite apparatuses 304, 306.

As shown in FIG. 3, the first kite apparatus 304 includes a wing structure 314 having a surface capable of catching wind from the air movement 308 and creating an upward force on the dual-kite aerial vehicle 302. The wing structure 314 can be constructed using a variety of light-weight materials. In addition, in one or more embodiments, the wing structure 314 has an airfoil shape designed based on a predicted altitude range and/or expected air movement 308 at the first altitude. In one or more embodiments, the wing structure 314 of the first kite apparatus 304 is similar to a wing structure 326 of the second kite apparatus 306. Alternatively, in one or more embodiments, the wing structure 314 of the first kite apparatus 304 has an airfoil shape specifically designed for a higher altitude while a wing structure 326 of the second kite apparatus 306 has a different airfoil shape based on an expected lower altitude of the second kite apparatus 306.

While the wing structure 314 of the first kite apparatus 304 (and similarly the wing structure 326 of the second kite apparatus 306) differs from the kite structures described above in connection with FIG. 2, the kite apparatuses 304, 306 shown in FIG. 3 include many similar components as described above in connection with FIG. 2. For example, the first kite apparatus 304 includes sensors 315, a flight controller 316, actuators 318, a power generator 322, and winch 324 that may include similar features and functionality as corresponding components described above in connection with the example shown in FIG. 2. Similarly, the second kite apparatus 306 includes sensors 327, a flight controller 328, actuators 330, a power generator 332, and a winch 334 that may include similar features and functionality as corresponding components of the first kite apparatus 304.

Further, while the flight controller 316 of the first kite apparatus 304 may include similar features and functionality as the flight controllers described in FIG. 2, in one or more embodiments, the flight controller 316 has a different structure than the flight controllers described above in reference with FIG. 2. For example, as shown in FIG. 3, in one or more embodiments, the flight controller 316 is enclosed within the wing structure 314 of the first kite apparatus 304. In one or more embodiments, the flight controller 316 is coupled to various components of the kite apparatus 304 (e.g., the sensors 315, actuators 318, power generator 322, winch 324, and solar panels 320) via wires or other electrical conductors that pass through the wing structure 314 to provide an electrical connection between the flight controller 316 and various components of the kite apparatus 304. In one or more embodiments, the flight controller 316 includes hardware for communicating wireless with various components of the first kite apparatus 304. As further shown, the flight controller 328 of the second kite apparatus 306 is similarly enclosed within the wing structure 326 of the second kite apparatus 306 and may include similar features and functionality as the first flight controller 316.

As mentioned above, the first kite apparatus 304 includes a power generator 322 for converting a force applied to the tether 312 to electrical energy to power components of the first kite apparatus 304. In addition, in one or more embodiments, the first kite apparatus 304 includes one or more solar panels 320 for collecting solar power to further provide electrical energy to components of the first kite apparatus 304. Similarly, the second kite apparatus 306 can include one or more solar panels 336 for collecting solar power and providing electrical energy to components of the second kite apparatus 306.

In addition, in one or more embodiments, one or both of the kite apparatuses 304, 306 include an additional source of power for maintaining high-altitude flight. For example, in addition to the power generators 322, 332 that provides power to electronic devices including the flight controllers 316, 328, actuators 318, 330, and other low-power devices on the respective kite apparatuses 304, 306, in one or more embodiments, one or both of the kite apparatuses 304, 306 include a battery or fuel-powered engine for providing additional flight functionality. Accordingly, while one or more embodiments described herein describe power generators as providing the sole source of electrical power to the respective structures, in one or more embodiments, the kite apparatuses 304, 306 include additional sources of power unrelated to or non-dependent on air movement, solar exposure, or other environmental conditions.

Figure 4:
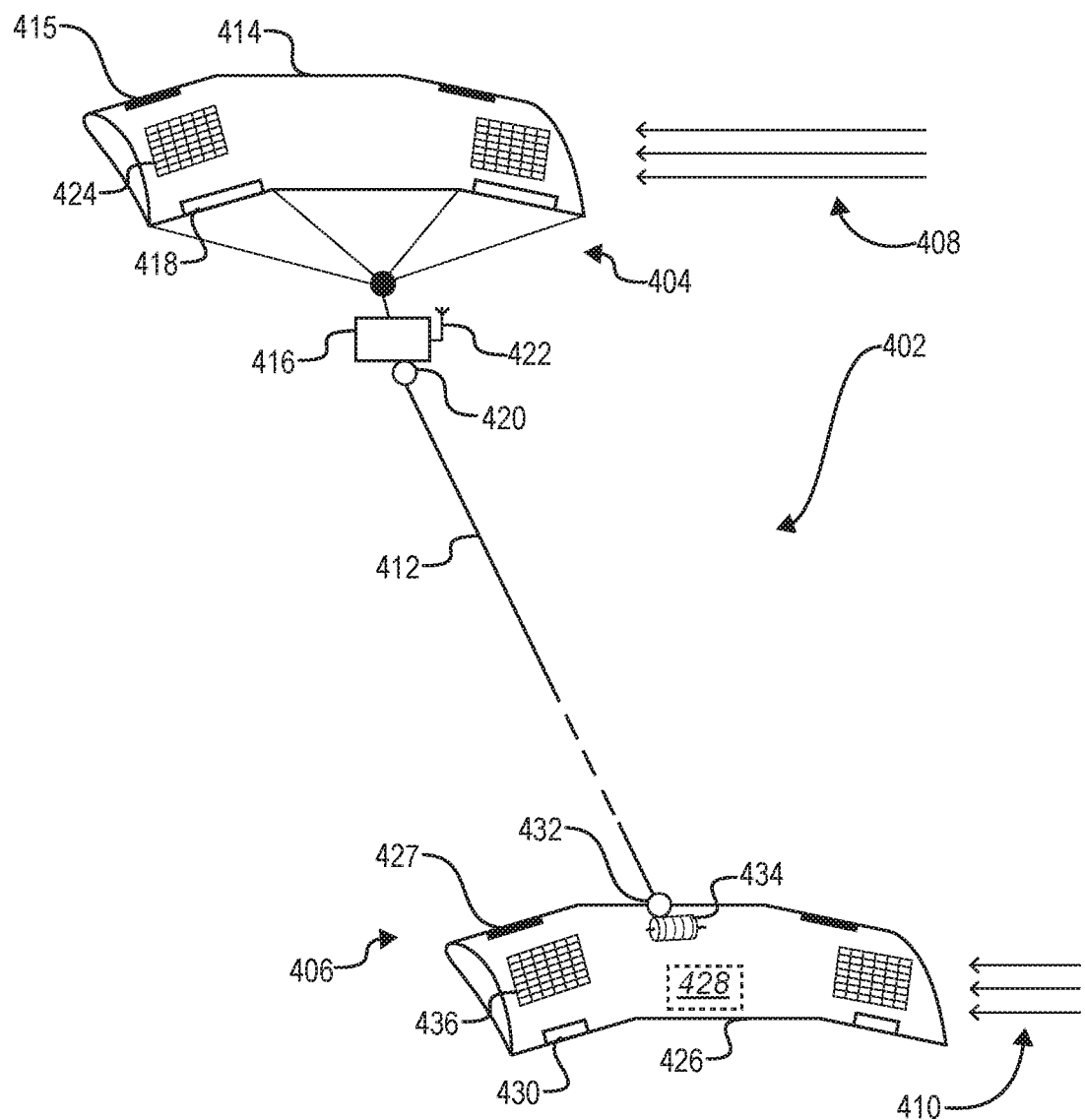
FIG. 4 illustrates yet another example dual-kite aerial vehicle in accordance with one or more embodiments.

FIG. 4 illustrates yet another example embodiment of a dual-kite aerial vehicle 402 in accordance with one or more embodiments described herein. In particular, FIG. 4 illustrates a dual-kite aerial vehicle 402 including a first kite apparatus 404 at a first altitude corresponding to a first air movement 408 and a second kite apparatus 406 at a second altitude corresponding to a second air movement 410. Similar to one or more embodiments described herein, the first kite apparatus 404 and the second kite apparatus 406 maintain flights at respective altitudes to maintain a target gradient air movement between the first air movement 408 and the second air movement 410.

As further shown in FIG. 4, the dual-kite aerial vehicle 402 includes a tether 412 that extends between the first kite apparatus 404 and the second kite apparatus 406. In particular, the dual-kite aerial vehicle 402 includes a single tether 412 having a significantly longer length (e.g., by a factor of 10, 100, 1000) than one or more dimensions of the respective structures of the kite apparatuses 404, 406 and/or lines (e.g., command lines) connecting a flight controller to a corresponding wing structure. The tether 412 can have similar features and functionality as the tethers described in connection with FIGS. 2 and 3 above.

As shown in FIG. 4, the first kite apparatus 404 and the second kite apparatus 406 each have wing structures 414, 426 including similar features as the wing structures described above in connection with FIG. 3. In one or more embodiments, the wing structures 414, 426 include similar airfoil shapes and dimensions. Alternatively, in one or more embodiments, the wing structure 414 of the first kite apparatus 404 includes airfoil dimensions designed for a predicted first altitude corresponding to the first air movement 408 while the second wing structure 426 of the second kite apparatus 406 includes airfoil dimensions designed for a predicted second altitude corresponding to the second air movement 410.

Each of the first kite apparatus 404 and second kite apparatus 406 can include similar components as described above in connection with FIGS. 2-3. For example, as shown in FIG. 4, the first kite apparatus 404 includes sensors 415, a flight controller 416, actuators 418, a power generator 420, an antenna 422, and solar panels 424 on the wing structure 414. As further shown, the second kite apparatus 404 includes sensors 427, a flight controller 428 enclosed within the wing structure 426, actuators 430, a power generator 432, a winch 434, and solar panels 436.

As shown in FIG. 4, the first kite apparatus 404 and second kite apparatus 406 include one or more differences from other embodiments described herein. For example, the first kite apparatus 404 includes a flight controller 416 and antenna 422 within a different structure than the first wing structure 414. Alternatively, the second kite apparatus 406 includes an enclosed flight controller 428 within the second wing structure 426. In addition, in contrast to one or more embodiments described herein, the first kite apparatus 404 does not include a winch, enabling the second kite apparatus 406 to have exclusive control over the length of the tether 412 using the winch 434 included as part of the second wing structure 426. Alternatively, in one or more embodiments, the second kite apparatus 406 includes a winch 434 outside the wing structure 434 (e.g., similar to the winch 232 shown in FIG. 2).

Moreover, in one or more embodiments, the dual-kite aerial vehicle includes different structures between the kite apparatuses. For example, in one or more embodiments, the first kite apparatus includes a kite structure while the second kite apparatus includes a wing structure. In this way, the second kite apparatus provides a counter-weight that grants additional control to the flight controllers to modify or otherwise maintain a predefined flight path under a variety of flight conditions. In this example, a winch positioned on the counter-weight (e.g., the second kite apparatus including the wing structure) could create a counter-flapping motion of the kite structure of the first kite apparatus when causing the dual-kite aerial vehicle to climb altitude.

Figure 6:
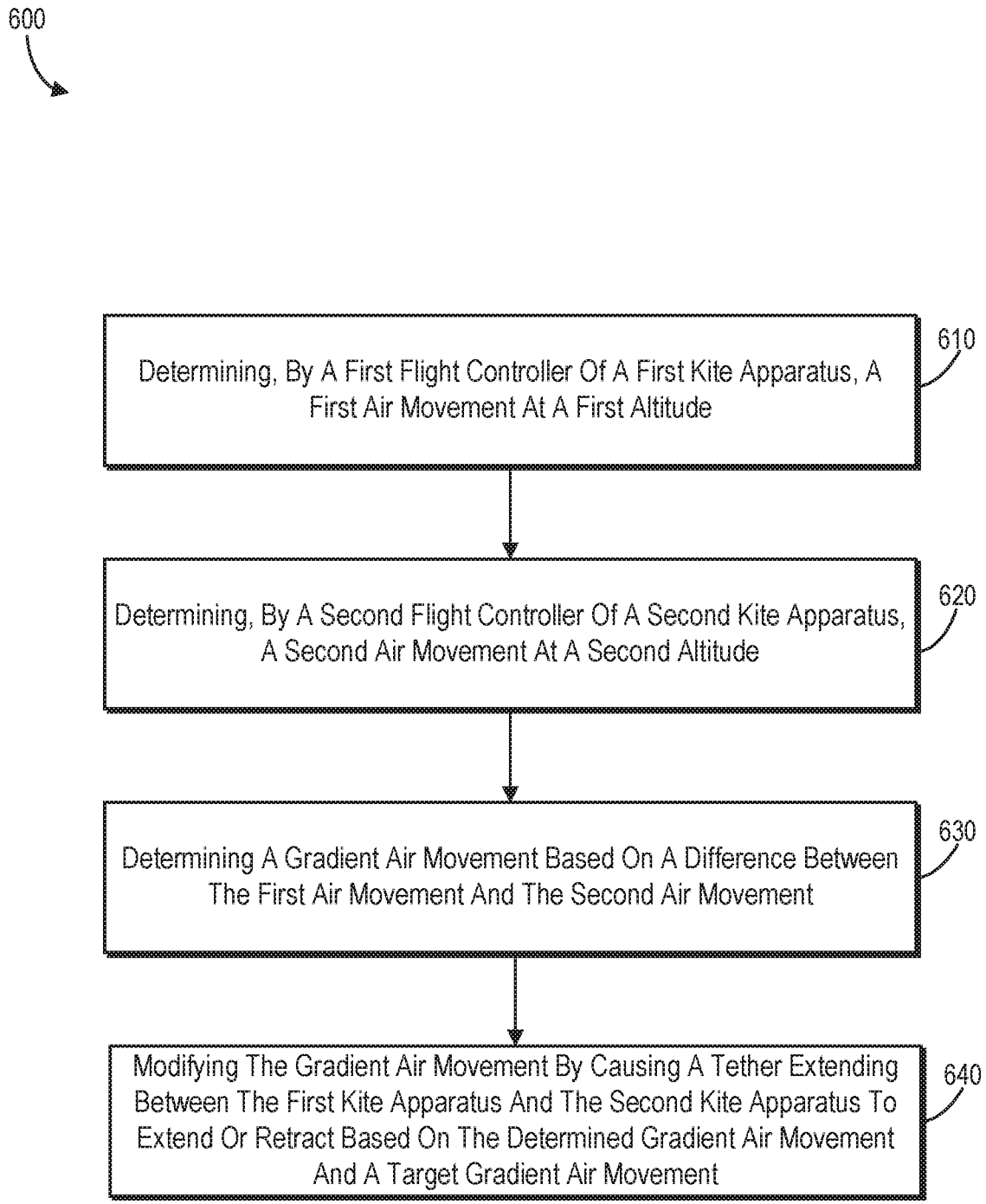
FIG. 6 illustrates a flowchart of a series of acts for implementing a dual-kite aerial vehicle in accordance with one or more embodiments.

Proceeding onto FIG. 6, additional detail will be provided regarding various components and capabilities of an example flight control system in accordance with one or more embodiments described herein. In particular, FIG. 6 illustrates an example flight control system 502 including flight controllers 504a-b for respective kite apparatuses. As shown in FIG. 6, the flight control system 502 includes a first flight controller 504a including a communication manager 506, an altitude manager 508 a flight path manager 510, and data storage 512 including mission data 514 and sensor data 516. The second flight controller 504b can include similar components as the first flight controller 504a. Accordingly, features and functionality described in connection with the first flight controller 504a can similarly apply to the second flight controller 504b.

Figure 5:
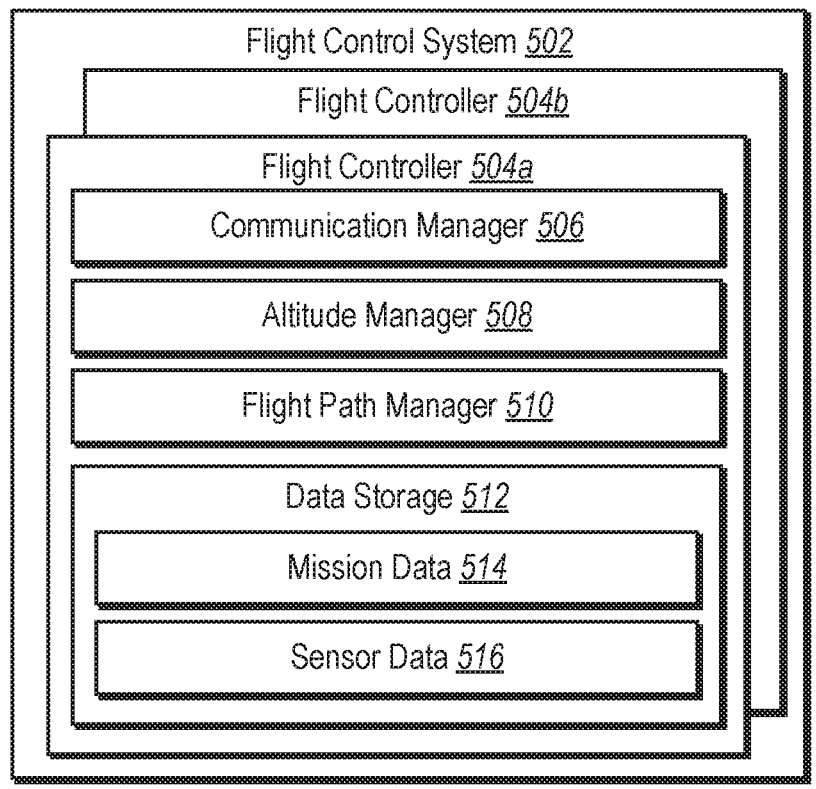
FIG. 5 illustrates a block diagram of an example flight control system implemented in connection with a dual-kite aerial vehicle in accordance with one or more embodiments.

As just mentioned, and shown in FIG. 5, the first flight controller 504a includes a communication manager 506. In one or more embodiments, the communication manager 506 manages and facilitates communication between the first flight controller 504a and other devices. For example, the communication manager 506 can send and receive communications (e.g., wired or wireless communications) to and from the second flight controller 504b to coordinate movement of a dual-kite aerial vehicle. For instance, the communication manager 506 on the first kite apparatus can receive data captured from one or more sensors on the second kite apparatus (e.g., from the second flight controller 504b) for use in determining an optimal flight path. In addition, the communication manager 506 can transmit data to the second flight controller 504b. In this way, the communication manager 506 can facilitate coordination in maintaining a particular flight path and/or target gradient air movement between the first flight controller 504a and the second flight controller 504b.

In addition to facilitating communication between the first flight controller 504a and the second flight controller 504b, the communication manager 506 can additionally manage communication between one or both of the flight controllers 504a-b and a ground station. For example, in one or more embodiments, the communication manager 506 facilitates sending and receiving data to and from a FOC 102. For instance, the communication manager 506 can receive mission instructions including a target flight path and other relevant data. In addition, the communication manager 506 can transmit a current position and other data to the FOC 102.

As further shown in FIG. 5, the first flight controller 504a includes an altitude manager 508. In particular, the altitude manager 508 controls an altitude of the first kite controller 504a relative to the second kite controller 504b. For instance, in one or more embodiments, the altitude manager 508 controls a length of a tether extending between a first kite apparatus and a second kite apparatus by activating one or more actuators and/or a winch coupled to the tether. In particular, the altitude manager 508 can receive sensor data and determine whether the tether needs to lengthened or shortened to maintain a target gradient air movement between a first detected air movement at an altitude of the first kite apparatus and a second detected air movement at an altitude of the second kite apparatus.

To illustrate, if the altitude manager 508 determines (e.g., based on captured sensor data from both the kite apparatuses) that a gradient air movement is below a target gradient air movement, the altitude manager 508 activates the winch and causes the winch to extend a length of the tether.

Alternatively, if the altitude manager 508 determines that a gradient air movement is above a target gradient air movement, the altitude manager 508 activates the winch and causes the winch to retract the length of the tether. Where each of the kite apparatuses include a respective winch, the altitude manager 508 on either (or both) of the flight controllers 504a-b can simultaneously activate respective winches. Alternatively, where only one of the kite apparatuses include a winch, the altitude manager 508 on the corresponding flight controller can activate the winch.

As further shown in FIG. 5, the first flight controller 504a includes a flight path manager 510. In particular, the flight path manager 510 manages a path of the dual-kite aerial vehicle over a geographic area. For example, where one or both of the flight controllers 504a-b receive instructions from the FOC 102, the flight path manager 510 can activate actuators of the kite apparatuses to maintain the desired flight path. In particular, based on a received flight mission and further based on captured data from sensors, the flight path manager 510 can selectively active one or more actuators on a corresponding kite apparatus to cause the kite apparatus to change a flight path. In addition, the flight path manager 510 of the first flight controller 504a can utilize the communication manager 506 to coordinate with the second flight controller 504b to similarly activate actuators on the second kite apparatus. In this way, the flight path manager 510 on the first flight controller 504a can coordinate with a flight path manager on the second flight controller 504b to control a flight path of the dual-kite aerial vehicle.

As further shown in FIG. 5, the flight controller 504a includes a data storage 512 including mission data 514. The mission data 514 can refer to any data pertaining to a directive of the dual-kite aerial vehicle. For example, the mission data 514 can include a defined geographic area over which the dual-kite aerial vehicle must remain. In addition, the mission data 514 can include a target gradient air movement that the flight controllers 504a-b are directed to maintain. Further, the mission data 514 can include data for providing bandwidth or internet connectivity to client devices over a geographic area.

The data storage 512 can further include sensor data 516. The sensor data 516 can include any raw or processed data captured by one or more sensors implemented on the dual-kite aerial vehicle. For example, the sensor data 516 can include temperature data captured by a temperature sensor (e.g., a thermistor circuit), air movement data captured by a wind sensor (e.g., an anemometer), altitude data captured using one or more barometers, and other data captured by one or more sensors implemented within the flight controllers 504a-b and/or on a structure of a corresponding kite apparatus. As mentioned above, sensor data 516 can include data captured by sensors of a corresponding kite apparatus in addition to data captured by sensors of a different kite apparatus.

Each of the components 506-512 of the first flight controller 504a (and corresponding components of the second flight controller 504b) may be in communication with one another using any suitable communication technologies. It will be recognized that although components 506-512 and their corresponding elements are shown to be separate in FIG. 5, any of components 506-512 and their corresponding elements may be combined into fewer components, such as into a single facility or module, divided into more components, or configured into different components as may serve a particular embodiment.

The components 506-512 and their corresponding elements can comprise software, hardware, or both. For example, the components 506-512 and their corresponding elements can comprise one or more instructions stored on a computer-readable storage medium and executable by processors of one or more computing devices. The components 506-512 and their corresponding elements can comprise hardware, such as a special purpose processing device to perform a certain function or group of functions. Additionally, or alternatively, the components 506-512 and their corresponding elements can comprise a combination of computer-executable instructions and hardware.

Turning now to FIG. 6, this FIG. illustrates a flowchart of a series of acts 600 of implementing a dual-kite aerial vehicle in accordance with one or more embodiments. In particular, FIG. 6 illustrates a series of acts performed by one or a combination of multiple flight controllers on respective kite apparatuses of the dual-kite aerial vehicle. While FIG. 6 illustrates acts according to one or more embodiments, alternative embodiments may omit, add to, reorder, and/or modify any of the acts shown in FIG. 6. The acts of FIG. 6 can be performance as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown in FIG. 6, the series of acts 600 includes an act 610 of determining, by a first flight controller of a first kite apparatus, a first air movement at a first altitude. For example, in one or more embodiments, the act 610 includes determining, by a first flight controller of a first kite apparatus, a first air movement at a first altitude corresponding to an altitude of the first kite apparatus. For example, in one or more embodiments, sensors on the first kite apparatus capture a measurement of wind speed (or other air movement) at the first altitude corresponding to an altitude of the first kite apparatus.

The series of acts 600 further includes an act 620 of determining, by a second flight controller of a second kite apparatus, a second air movement at a second altitude. For example, in one or more embodiments, the act 620 includes determining, by a second flight controller of a second kite apparatus, a second air movement at a second altitude corresponding to an altitude of the second kite apparatus. For example, in one or more embodiments, sensors on the second kite apparatus capture a measurement of wind speed (or other air movement) at the second altitude (e.g., lower than the first altitude) corresponding to an altitude of the second kite apparatus.

The series of acts 600 further includes an act 630 of determining a gradient air movement based on a difference between the first air movement and the second air movement. For example, in one or more embodiments, the act 630 includes determining a gradient air movement based on a difference between the first air movement and the second air movement. In one or more embodiments, the gradient air movement includes a dynamic measurement between current altitudes of the first and second kite apparatuses.

The series of acts 600 further includes an act 640 of modifying the gradient air movement by causing a tether extending between the first kite apparatus and the second kite apparatus to extend or retract. For example, in one or more embodiments, the act 640 includes modifying the gradient air movement by causing a tether extending between the first kite apparatus and the second kite apparatus to extend or retract based on the determined gradient air movement and a target gradient air movement. For example, in one or more embodiments, one or both of the flight controllers receive mission instructions including a target gradient air movement to maintain over a course of a flight.

In one or more embodiments, modifying the gradient air movement includes, if the determined gradient air movement is greater than the target gradient air movement, activating a winch on the second kite apparatus to retract a length the tether. Alternatively, in one or more embodiments, modifying the gradient air movement includes, if the determined gradient air movement is less than the target gradient air movement, activating the winch on the second kite apparatus to extend the length of the tether. Moreover, if the determined gradient air movement is the same (or within a defined margin of error) of the target gradient air movement, the method includes not activating the winch to maintain the present gradient air movement.

In one or more embodiments, the method 600 further includes raising altitudes of both the first kite apparatus and the second kite apparatus. For example, in one or more embodiments, the method 600 includes activating the winch to alternatively extend and retract the length of the tether extending between the first kite apparatus and the second kite apparatus to generate a lifting force on both the first kite apparatus and the second kite apparatus.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
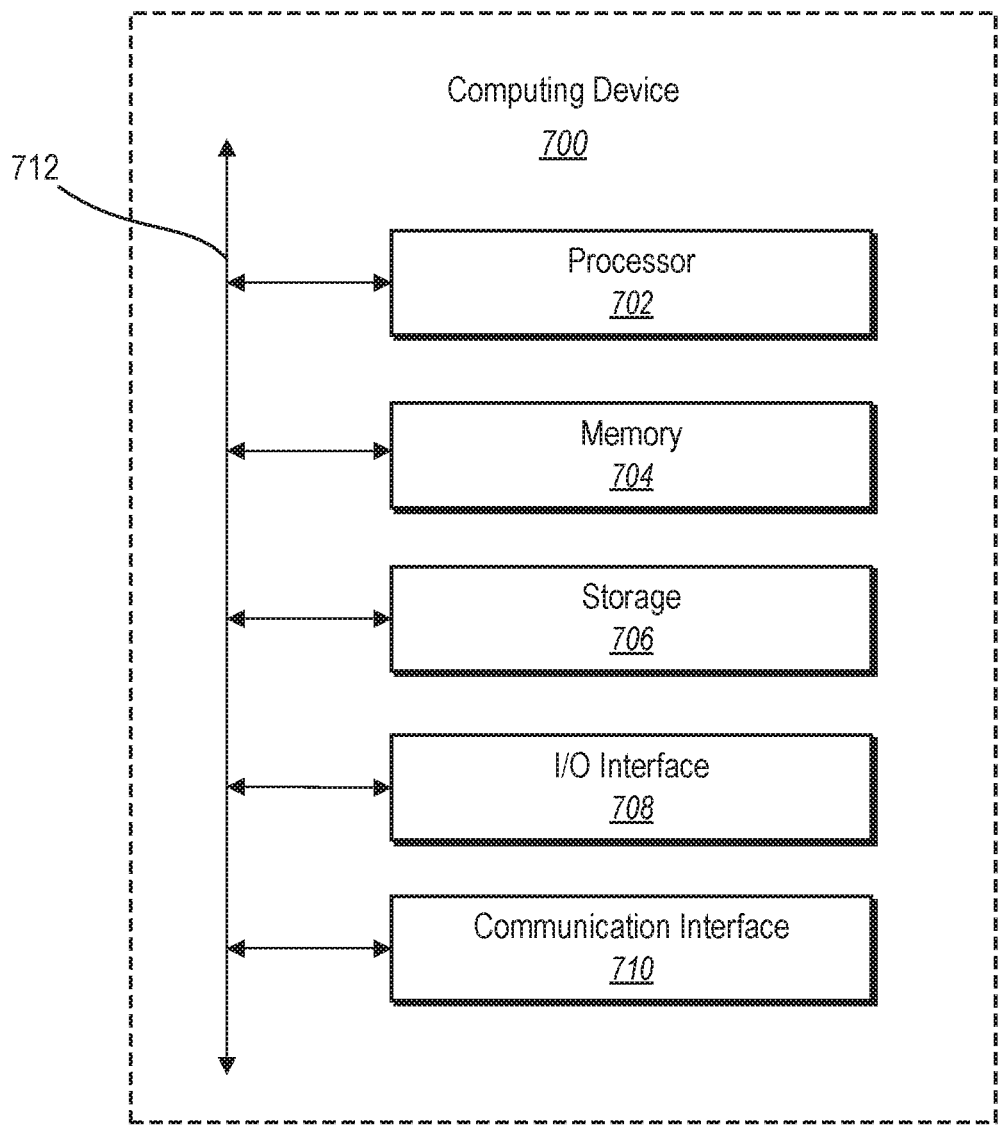
FIG. 7 illustrates a block diagram of a computing device in accordance with one or more embodiments.

FIG. 7 illustrates a block diagram of exemplary computing device 700 that may be configured to perform one or more of the processes described above. One will appreciate that one or more computing devices such as the computing device 700 may implement one or more components of the flight controllers implemented on respective kite apparatuses of a dual-kite aerial vehicle. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example, and not by way of limitation, the processor 702 may include one or more instruction caches, one or more data caches, and one or more translation lookaside buffers (TLBs). Instructions in the instruction caches may be copies of instructions in the memory 704 or the storage device 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The storage device 706 includes storage for storing data or instructions. As an example, and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A dual-kite aerial vehicle, comprising:
   a first kite apparatus comprising:
      a first flight controller coupled to one or more actuators of the first kite apparatus to control a flight path of the first kite apparatus; and
      a first power generator powering the first flight controller;
   a second kite apparatus comprising:
      a second flight controller coupled to one or more actuators of the second kite apparatus to control a flight path of the second kite apparatus such that a target gradient air movement between a first air movement at a first altitude of the first kite apparatus and a second air movement at a second altitude of the second kite apparatus is maintained; and
      a second power generator powering the second flight controller; and
   a tether coupling the first power generator of the first kite apparatus to the second power generator of the second kite apparatus.

2. The dual-kite aerial vehicle of claim 1, wherein the tether coupling the first power generator of the first kite apparatus to the second power generator of the second kite apparatus comprises a non-conductive material that encloses a conductive path that passes through the first power generator to the first flight controller on the first kite apparatus and the second power generator to the second flight controller on the second kite apparatus.

3. The dual-kite aerial vehicle of claim 1, wherein the first power generator converts a mechanical force exerted on the tether by a gradient air movement between the first air movement and the second air movement to electrical energy to power the first flight controller and the one or more actuators of the first kite apparatus.

4. The dual-kite aerial vehicle of claim 3, wherein the second power generator converts the mechanical force exerted on the tether by a gradient air movement between the first air movement and the second air movement to electrical energy to power the second flight controller and the one or more actuators of the second kite apparatus.

5. The dual-kite aerial vehicle of claim 1, further comprising:
   a flight control system comprising the first flight controller and the second flight controller; and
   wherein the flight control system maintains the target gradient air movement by changing a length of the tether coupling the first power generator of the first kite apparatus to the second power generator of the second kite apparatus.

6. The dual-kite aerial vehicle of claim 5, further comprising a winch coupled to the first power generator, wherein the flight control system maintains the target gradient air movement by activating the winch to extend or retract the length of the tether.

7. The dual-kite aerial vehicle of claim 6, wherein the flight control system controls altitudes of both the first kite apparatus and the second kite apparatus by activating the winch to alternatively extend and retract the tether to create a flapping motion of a structure of the first kite apparatus.

8. The dual-kite aerial vehicle of claim 1, wherein the second kite apparatus further comprises communication hardware for providing internet connectivity to a plurality of client devices within a predefined geographic area.

9. The dual-kite aerial vehicle of claim 1, wherein the first flight controller and the second flight controller maintain the flight paths of the first kite apparatus and the second kite apparatus by selectively activating the one or more actuators of the first kite apparatus and the one or more actuators of the second kite apparatus to cooperatively control the flight paths of the first kite apparatus and the second kite apparatus to remain within a predetermined region corresponding to a predetermined geographic area.

10. A dual-kite aerial vehicle, comprising:
    a first kite apparatus comprising:
       a first wing structure;
       a first flight controller coupled to one or more actuators of the first kite apparatus to control a flight path of the first kite apparatus; and
       a first power generator powering the first flight controller;
    a second kite apparatus comprising:
       a second wing structure;
       a second flight controller coupled to one or more actuators of the second kite apparatus to control a flight path of the second kite apparatus such that a target gradient air movement between a first air movement at a first altitude of the first kite apparatus and a second air movement at a second altitude of the second kite apparatus is maintained; and
       a second power generator powering the second flight controller; and a tether coupling the first power generator of the first kite apparatus to the second power generator of the second kite apparatus.

11. The dual-kite aerial vehicle of claim 10, wherein the tether coupling the first power generator of the first kite apparatus to the second power generator of the second kite apparatus comprises a non-conductive material that encloses a conductive path that passes through the first power generator to the first flight controller on the first kite apparatus and the second power generator to the second flight controller on the second kite apparatus.

12. The dual-kite aerial vehicle of claim 10, where:
the first power generator converts a mechanical force exerted on the tether by a gradient air movement between the first air movement and the second air movement to electrical energy for powering the first flight controller and the one or more actuators of the first kite apparatus; and
the second power generator converts the mechanical force exerted on the tether by a gradient air movement between the first air movement and the second air movement to electrical energy for powering the second flight controller and the one or more actuators of the second kite apparatus.

13. The dual-kite aerial vehicle of claim 10, wherein:
the first flight controller is enclosed within the first wing structure of the first kite apparatus; and
the second flight controller is enclosed within the second wing structure of the second kite apparatus.

14. The dual-kite aerial vehicle of claim 10, further comprising a winch coupled to the second power generator, wherein the second flight controller maintains the target gradient air movement by activating the winch to extend or retract a length of the tether extending between the first kite apparatus and the second kite apparatus.

15. The dual-kite aerial vehicle of claim 14, wherein the winch is mounted on the second wing structure.

16. The dual-kite aerial vehicle of claim 10, wherein:
the first wing structure comprises a first airfoil shape designed for a predicted altitude of the first kite apparatus; and
the second wing structure comprises a second airfoil shape designed for a predicted altitude of the second kite apparatus lower than the predicted altitude of the first kite apparatus.

17. The dual-kite aerial vehicle of claim 10, wherein:
the first kite apparatus comprises one or more solar panels mounted to the first wing structure for converting solar power to electrical energy to further power the first flight controller and the one or more actuators of the first kite apparatus; and
the second kite apparatus comprises one or more solar panels mounted to the second wing structure for converting solar power to electrical energy to further power the second flight controller and the one or more actuators of the second kite apparatus.

18. A method comprising:
determining, by a first flight controller of a first kite apparatus, a first air movement at a first altitude corresponding to an altitude of the first kite apparatus;
determining, by a second flight controller of a second kite apparatus, a second air movement at a second altitude corresponding to an altitude of the second kite apparatus;
determining a gradient air movement based on a difference between the first air movement and the second air movement, wherein:
the first altitude is higher than the second altitude,
the first air movement is different from the second air movement, and
the first air movement and the second air movement are in a same direction; and
modifying the gradient air movement by causing a tether coupling a first power generator of the first kite apparatus to a second power generator of the second kite apparatus to extend or retract based on the determined gradient air movement and a target gradient air movement and generate power for at least one of the first flight controller or the second flight controller.

19. The method of claim 18, wherein modifying the gradient air movement between the first air movement and the second air movement comprises:
if the determined gradient air movement is greater than the target gradient air movement, activating a winch on the second kite apparatus to retract a length the tether; and
if the determined gradient air movement is less than the target gradient air movement, activating the winch on the second kite apparatus to extend the length of the tether.

20. The method of claim 19, further comprising raising altitudes of both the first kite apparatus and the second kite apparatus by activating the winch to alternatively extend and retract the length of the tether extending between the first kite apparatus and the second kite apparatus to generate a lifting force on both the first kite apparatus and the second kite apparatus.

* * * * *